(12) United States Patent
Oser et al.

(10) Patent No.: US 8,196,406 B2
(45) Date of Patent: Jun. 12, 2012

(54) CONVERSION OF HEAT INTO MECHANICAL ENERGY BY MEANS OF A JET COMPRESSOR

(75) Inventors: Erwin Oser, Cologne (DE); Hubert Hamm, Recklinghausen (DE); Michael Rannow, Lennestadt (DE)

(73) Assignee: Ecoenergy Patent GmbH, Darmstadt (DE)

( * ) Notice: Subject to any disclaimer, the term of this patent is extended or adjusted under 35 U.S.C. 154(b) by 674 days.

(21) Appl. No.: 12/300,692

(22) PCT Filed: May 10, 2007
(Under 37 CFR 1.47)

(86) PCT No.: PCT/EP2007/054544
§ 371 (c)(1),
(2), (4) Date: Jun. 8, 2009

(87) PCT Pub. No.: WO2007/131943
PCT Pub. Date: Nov. 22, 2007

(65) Prior Publication Data
US 2009/0249780 A1    Oct. 8, 2009

(30) Foreign Application Priority Data

May 16, 2006    (DE) .......................... 10 2006 022 792

(51) Int. Cl.
*F01K 19/10*  (2006.01)
*F01K 9/00*   (2006.01)
*F01K 25/06*  (2006.01)
*F28B 3/00*   (2006.01)

(52) U.S. Cl. ................. 60/688; 60/685; 60/649; 60/673

(58) Field of Classification Search .................... 60/649, 60/673, 685, 688
See application file for complete search history.

(56) References Cited

U.S. PATENT DOCUMENTS

| | | | | |
|---|---|---|---|---|
| 3,861,151 A * | 1/1975 | Hosokawa | ...................... | 60/689 |
| 4,051,680 A * | 10/1977 | Hall | .............................. | 60/689 |
| 4,089,177 A * | 5/1978 | Olofsson | ........................ | 60/688 |
| 4,442,675 A * | 4/1984 | Wilensky | ........................ | 60/654 |
| 4,843,823 A * | 7/1989 | Freedman | ...................... | 60/649 |

FOREIGN PATENT DOCUMENTS

| FR | 981410 | 5/1951 |
|---|---|---|
| WO | WO 93/01397 | 1/1993 |
| WO | WO 2005/061858 | 7/2005 |

* cited by examiner

*Primary Examiner* — Thomas Denion
*Assistant Examiner* — Christopher Jetton
(74) *Attorney, Agent, or Firm* — Occhiuti Rohlicek & Tsao LLP

(57) ABSTRACT

A method for converting heat energy into mechanical, electrical and/or thermal energy, includes two circuits which are connected one common subsection. The first circuit has an expansion apparatus, and the common subsection is connected to the first and second circuit via a jet compressor. A working medium is routed in the first circuit and a propellant is routed in the second circuit and a mixture of working medium and propellant is routed in the common subsection. The mixture is separated into a working medium stream and a propellant stream in a separation apparatus. The working medium is recirculated into the first circuit and is supplied to an evaporator unit. The evaporated working medium is supplied to the expansion apparatus and subsequently to the jet compressor. The separated propellant is recirculated into the second circuit and is supplied to a collector and is then supplied to the jet compressor.

33 Claims, 2 Drawing Sheets

CONVERSION OF HEAT INTO MECHANICAL ENERGY BY MEANS OF A JET COMPRESSOR

CROSS-REFERENCE TO RELATED APPLICATIONS

This application is the National Stage of International Application No. PCT/EP2007/054544, filed on May 10, 2007, which claims the priority of German Application No. 10 2006 022 792.1, filed on May 16, 2006. The contents of both applications are hereby incorporated by reference in their entirety.

The invention relates to a method and a plant for the conversion of heat energy into mechanical energy by the expansion of a vaporous working medium in an expansion apparatus connected to a first evaporator. The invention in this case provides the possibility that virtually all or all energy, hereafter also designated as auxiliary energies, for the generation and conveyance of vapours and gases occurring is provided completely from the kinetic energy, generated by means of the method according to the invention, of the vaporous working medium formed, for example, in the evaporator and/or of the propellant formed, for example, in a collector as a second independent evaporation assembly, so that, in this embodiment, no or virtually no additional mechanical or electrical auxiliary energies are required for carrying out the method according to the invention.

Moreover, the invention is suitable, in the conversion of heat quantities occurring at different temperature levels, of implementing energy-efficient design alternatives.

For the conversion of heat energy to mechanical energy, various methods and apparatuses are known according to the prior art. Steam power stations operate at a pressure of 200 to more than 400 bar with expansion to approximately 40 mbar, that is to say such plants operate with a pressure ratio in the range of 500 to 1000 for energy recovery. In these methods, essentially, the mechanical energy from the expansion of a vaporous working medium generated by heat by means of the evaporation is converted further into electrical energy with the aid of generators. For high energy efficiency, that is to say a high conversion efficiency of heat into mechanical energy, a high pressure ratio has to be provided for expansion in plants and methods known from the prior art. Consequently, conventional plants are operated with high initial pressures which are set by the evaporation of a propellant gas at high temperatures, that is to say steam of at least 500° C. to 600° C. In this case, usually, turbines are used as expansion assemblies. After expansion, the propellant is condensed, the condensation heat which occurs having to be discharged as heat loss.

A further known method is the ORC process. In the ORC process, the working medium is likewise heated and evaporated. It is then expanded via a steam turbine in order to extract mechanical energy from the process. Downstream of the turbine, the steam is routed via a recuperator, in order to supply residual energy of the steam phase to the liquid working medium. Subsequently, the still vaporous working medium is condensed and is supplied anew to the process via the feed pump. Conventionally, temperature levels of the working steam of 150° C. to 300° C. are used for operating such plants.

In the special case of the conversion of solar heat energy into mechanical or electrical energy, particularly useful nowadays in terms of the utilization of renewable energies, what is known as solar-thermal current recovery by an expansion of vaporous working media, three different design alternatives are preferably adopted. In the first alternative, the solar radiation is concentrated by means of external mirrors on to a centrally arranged evaporator, by means of which a working medium is evaporated which is subsequently expanded in a turbine. In the second alternative, the concentration of the solar radiation takes place as early as in the interception apparatus, for example, parabolic trough collectors, in which an absorber tube runs in the focal axis of a linear parabolic mirror. The steam generated there is subsequently brought together and expanded in a central expansion turbine. This thermal expansion process in an expansion turbine corresponds essentially to the thermal expansion processes in power stations.

As the third, more recent alternative, dish/Stirling systems have since been used in which the solar radiation is concentrated in a parabolic mirror on to the evaporator space of a Stirling engine, with the result that the Stirling engine is driven.

The systems described hitherto have the disadvantage that a high initial temperature is required according to the Carnot conditions for high efficiency, that is to say, in this case of steam, at the present time $\geq 600°$ C. and, in the ORC method, $\geq 200°$ C., for the expansion of the steam. This is the reason for concentrating the solar radiation by means of mirror systems, since only in this way can the required high temperatures be achieved at all. One disadvantage of this is that these requirements can be fulfilled only in the case of direct solar radiation, that is to say not when the solar radiation is diffuse, as when the sky is overcast. This has adverse consequences for the availability of a plant set up in this way.

This is a particular disadvantage in those regions where the number of hours in a year with direct solar radiation is comparatively low, such as, for example, in northern and central Europe. It is therefore no surprise that generation of electrical energy from solar-thermal plants has hitherto been provided only in high-sunshine regions, such as, for example southern Europe, the high-sunshine states of the USA or other near-Equator regions.

The set aim of the invention, then, was to overcome at least one of the abovementioned disadvantages of the prior art.

The object is achieved, according to the invention by means of the features of Claim 1. Advantageous refinements of the invention are specified in the subclaims.

In particular, the subject of the present invention relates to a method for the conversion of heat energy into mechanical, electrical and/or thermal energy, the method comprising at least two interconnected circuits, the method comprising at least two circuits which are connected by means of at least one common subsection, the first circuit having at least one expansion apparatus, and the common subsection being connected to the first and second circuit via at least one jet compressor, a working medium being routed in the first circuit and a propellant being routed in the second circuit and a mixture of working medium and propellant being routed in the common subsection, the mixture formed in the jet compressor subsequently being separated into a working medium stream and a propellant stream in a separation apparatus, the working medium being recirculated into the first circuit and being supplied to an evaporator unit, the evaporated working medium being delivered to the expansion apparatus and subsequently to the jet compressor, and separated propellant being recirculated into the second circuit and, for the purpose of the absorption of heat energy, being supplied to a collector and being supplied to the jet compressor after the absorption of heat energy.

The working medium and the propellant may be identical or different.

It is preferable if the working medium and the propellant are formed from the same substance/substance mixture, so that the mixture is homogeneous.

It is preferable if the working medium and the propellant are formed from two different substances/substance mixtures, preferably immiscible liquids.

The steam feature within the meaning of this invention also embraces gaseous substances and also gases contain a liquid fraction, such as mist and the like.

The formulation whereby the propellant is conducted or routed "to and/or through the evaporator" for heat transmission means that the propellant is conducted through a device, for example, a tube, so that an intermixing with working medium or an emergence of the propellant into the working medium does not occur.

One advantage of the method according to the invention is, for example, the possibility of implementing the conversion of solar heat into mechanical energy even under an overcast sky. This means that, to intercept the solar radiation, simpler collectors or collector systems can be used, for example, plate condensers, in which the solar radiation is absorbed over a large area. The temperatures which can consequently be achieved and which are transmitted to a propellant flowing through, also designated hereafter as a heat transfer fluid, are in this case restricted to temperatures in the region around about $\leq 100°$ C., depending on the current heat transmission [Q.] of the external energy source.

An energy-efficient conversion of heat at this "low temperature level", that is to say at temperatures of, for example, 30° C. to 100° C., is technically relevant not only in solarthermy, but also in the utilization of other renewable energies, for example in geothermy or in the waste heat from internal combustion engines of BHKW driven by bioenergy. Furthermore, this temperature range is generally of great importance with regard to the waste heat from thermal industrial processes.

WO 2005061858 (WO 2004EP53654) specifies a method in which expansion takes place in a low-pressure expansion assembly preferably in the form of a rotary blower pump, also called a Roots blower pump, to which reference is made in full.

A rotary blower pump, also called a Roots blower pump or rotary piston blower, is a blower which operates without internal compression, that is to say which resembles gear and vane-cell pumps. For example, two-vane or even three-vane rotors transport a gas (mostly air) in the gaps between the vanes and the outer wall from the suction side to the delivery side and is then compressed by the backflow of the compressed gas.

The rotation of the rolling or rotary pistons encloses the air on the intake side between the rotor and housing and conveys it to the delivery side without internal compression. The conveying chamber is sealed off, oil-free, solely by virtue of the minimal gap between the rotor and housing.

Rotary blower pumps are offered, for example, by the following known manufacturers:

Kaeser Kompressoren GmbH,
Aerzener Maschinenfabrik GmbH,
RKR Verdichtertechnik GmbH.

The method according to the invention may have an expansion apparatus in the form of a low-pressure expansion apparatus, preferably at least one rotary blower pump, an oval wheel pump and/or a screw expander, preferably with a gastight suction space, a rotary blower pump being most preferable.

Low-pressure expansion within the meaning of this invention means that a working medium and/or a propellant is expanded from a higher pressure in the region of, for example, $\geq 1.2$ bar to 10 bar, preferably 2.5 bar to 8 bar and preferably 3 bar to 6 bar to a lower pressure.

High-pressure expansion in the meaning of this invention means that a working medium and/or a propellant is expanded from a higher pressure in the region of, for example, >10 bar to $\leq 20$ bar, preferably 12 bar to 18 bar and preferably 14 bar to 16 bar to a lower pressure.

According to the invention, there may be provision for at least one expansion apparatus for the conversion of heat energy into mechanical energy and/or electrical energy to be connected to at least one generator.

The working medium may be evaporated in an evaporator unit and expanded in an expansion apparatus following the evaporator unit.

The temperature and the pressure of the working medium which is supplied to the jet compressor is preferably lower than the temperature and the pressure of the propellant which is supplied to the jet compressor.

The method according to the invention may preferably be employed when the temperature of the external heat source amounts to $\leq 500°$ C., preferably $\geq 0°$ C. to $\leq 250°$ C., preferably $\geq 30°$ C. to $\leq 150°$ C., further preferably $\geq 50°$ C. to $\leq 120°$ C. and particularly preferably $\geq 70°$ C. to $\leq 90°$ C.

To increase the efficiency of the method according to the invention and of the plant according to the invention, it may be advantageous if the pressure of the working medium in the evaporator unit and/or upstream of the expansion apparatus amounts to $\geq 1.5$ bar and $\leq 10$ bar, preferably $\geq 2$ bar and $\leq 5$ bar and preferably $\geq 3$ bar and $\leq 4$ bar.

The pressure of the mixture of working medium and propellant may, for example, lie, directly after the jet compressor is left, at least 0.3 bar, preferably 0.5 bar to 6 bar, preferably 0.7 bar to 5 bar and particularly preferably 1 bar to 3 bar, above the pressure of the working medium between the evaporator unit and the expansion apparatus.

The method according to the invention provides that the propellant is evaporated and supplied to the jet compressor at the temperature level provided via a suitable collector and/or a heat source.

It may be preferable if the propellant experiences heat energy absorption in the collector, so that the propellant, preferably as steam, has a pressure of more than 2 bar, preferably more than 4 bar, even more preferably more than 5 bar, and at most 10 bar, prior to entry into the jet compressor.

It may be preferable furthermore, if the working medium has a lower molar evaporation enthalpy than the propellant, in order thereby to generate a large steam volume.

Low molar evaporation enthalpies may amount, for example, to $\leq 30$ kJ/mol, preferably $\leq 25$ kJ/mol, even more preferably $\geq 15$ kJ/mol and $\leq 20$ kJ/mol.

The propellant may be introduced into the jet compressor as steam and/or liquid. It is advantageous if the liquid is close to or at the boiling point under the given pressure conditions.

By way of example, close to boiling point can be a temperature that lies at most >0° C. to $\leq 15°$ C., preferably $\geq 1°$ C. to $\leq 10°$ C. and particularly preferably $\geq 2°$ C. to $\leq 8°$ C. below the boiling point of the propellant used, in each case under the given pressure which prevails in the supply line to the jet compressor.

The working medium steam generated in the evaporator unit may have a temperature in the region of $\geq 30°$ C. and $\leq 120°$ C., preferably of $\geq 35°$ C. and $\leq 100°$ C. and preferably of $\geq 40°$ C. and $\leq 90°$ C.

The working medium steam, after expansion and upstream of the jet compressor, may have, in particular pressures in the region of $\geqq 0.5$ bar and $\leqq 3$ bar, preferably of $\geqq 0.7$ bar and $\leqq 2$ bar and preferably of $\geqq 1$ bar and $\leqq 1.5$ bar.

According to the invention, the working medium and/or propellant may be short-chain organic solvents from the class of monovalent or polyvalent alcohols, aldehydes, ketones or esters, refrigerants, short-chain hydrocarbons with secondary groups or silicones.

Exemplary embodiments of the method according to the invention are described below on the basis of propellant generated from propellant in a collector or heat collector. However, propellant in continuously liquid form may also be used, that is to say it may be advantageous, according to the invention, if the propellant is not evaporated. Conventionally, the specific heat capacity of liquids is better than that of gases. Since the propellant is used to transmit heat energy to the working medium, the sole use of an only liquid propellant may be advantageous for the overall process of the method.

The comparable versions based on compression caused by a hot propellant are likewise the subject of the invention. In this embodiment, there is no mixture formed in the compressor, but, instead a two-phase mixture.

Jet compressors, in the version either as a steam jet compressor or as a liquid jet compressor, utilize the energy of a higher-pressurized steam/liquid and thereby compress low-pressurized steam to a medium pressure level. Mainly, such jet compressors are operated with steam or water and also serve mostly for the compression of steam. Basically, the jet compressors may be operated with any desired vapours/liquids and are capable of conveying the most diverse possible vapours.

Conventionally, a jet compressor comprises a nozzle for the propellant in conjunction with a diffuser and an intake connection piece for the working medium. By means of the nozzle, pressure energy of the propellant is converted into velocity energy. The propellant jet entrains working medium sucked in via the intake connection piece, the mixture being formed from working medium or propellant. Furthermore, the propellant partially discharges its energy to the sucked-in working medium by pulse exchange. The mixture obtained subsequently undergoes compression in the diffuser, the pressure of the mixture increasing to a medium pressure level. That is to say, this pressure of the mixture is lower than the pressure of the propellant prior to entry into the nozzle of the jet compressor, but higher than the pressure of the sucked-in working medium. The diffuser has an increasing cross section, so that the flow is slowed down, and therefore, according to Bernoulli, the static pressure rises.

It may be preferable if the final pressure of the mixture directly after compression in the diffuser of the jet compressor is higher than the pressure in the evaporator in which the working medium is evaporated, so that the pressure-dependent condensation temperature of the mixture is higher than the evaporation temperature of the working medium, so that heat can be transmitted to the working medium.

Jet compressors are used in evaporation, distillation, cooling, crystallization, deodorizing, degassing and drying.

In the jet compressor, expanded working medium for the first circuit and propellant from the second circuit are compressed. The mixture of working medium and propellant is subsequently also designated as a mixture.

According to the invention, the working medium and the propellant may consist of the same components or of different components.

The working medium and propellant are separated in a separation apparatus.

In the event of the working medium and propellant consisting of the same components, a first part stream is routed as working medium into the evaporator unit in a separation apparatus or a jet compressor, that is to say into the first circuit and a second part stream is recirculated as propellant into the second circuit. It will be appreciated that the distribution of working medium and propellant should be selected such that the respective circuits do not run dry.

In the event that the working medium and propellant consist of different components, these are separated, for example, on the basis of different physical properties, such as density differences, immiscibility, etc. It will be appreciated that the distribution of working medium and propellant should be selected such that the respective circuits do not run dry.

The working medium, after separation in the separation unit, is recirculated into the evaporator unit, and the propellant is recirculated into the collector for heat energy absorption.

The separation unit, also called a separation apparatus, may have levelling. Levelling may be a level-controlled valve.

For example, the control may be such that propellant and working medium are in each case always present in sufficient quantity in the two evaporators. This condition may be detected, for example, by means of at least one level sensor in the evaporator unit and/or in the collector, by means of which valves in the respective supply lines are activated, so that the liquid level in the evaporators fluctuates, for example, between a set minimum and maximum level.

The path of the working medium in the first circuit is described below. Liquid working medium is evaporated in the evaporator unit. The energy required for evaporating the liquid working medium in the evaporator may originate from an external heat source and/or originate due to the heat transmission of the mixture of working medium and propellant. Heat transmission preferably takes place solely from the mixture. Heat transmission preferably takes place in that at least one heat exchange apparatus, for example, in the form of tubes, plates, etc., is arranged in and/or on the evaporator unit, so that heat transmission to the working medium can take place. Particularly preferably, the mixture for heat transmission is used which is routed through a tube which is at the evaporator unit and/or through the evaporator unit. If the mixture is present as vapour, it can be condensed on account of heat transmission. In order to allow heat transmission, it is necessary that the temperature of the mixture is higher than the temperature of the working medium for the purpose of heat transmission. Furthermore, it is preferable if, for the purpose of heat transmission, the pressure of the mixture is higher than the pressure of the working medium in the evaporator. Preferably, a temperature difference between the working medium in the evaporator and the mixture is $\geqq 3°$ C. to $\leqq 20°$ C., preferably $\geqq 5°$ C. to $\leqq 15°$ C. and preferably $\geqq 7°$ C. to $\leqq 10°$ C.

The working medium evaporated in the evaporator unit, also designated as an evaporator, is supplied to an expansion apparatus. The vaporous working medium preferably has a pressure in the range of 1.5 bar to 5 bar, preferably 2 bar to 4 bar.

The vaporous working medium is expanded in the expansion apparatus. The pressure of the vaporous working medium, after pressure expansion in the evaporator, lies in the range of 0.3 bar to 3 bar, preferably 0.5 bar to 1.5 bar. Particularly preferably, the pressure difference of the vaporous working medium before and after pressure expansion amounts to 1 bar to 4 bar, preferably 1.5 bar to 3 bar.

After pressure expansion, the vaporous working medium and propellant from the second circuit are supplied to the jet compressor and therefore in the common subsection.

The propellant is brought to a higher temperature level in a collector by external heat supply, for example, waste heat from industrial processes and/or from combustion processes, geothermy, solar heat and the like.

According to one embodiment, the liquid propellant which has been brought to a higher temperature level is supplied to the jet compressor.

According to another embodiment, liquid propellant is evaporated in the collector, so that vaporous, also designated as gaseous, propellant is supplied to the jet compressor.

According to a further embodiment, the second circuit has at least one expansion apparatus. The propellant expanded in the expansion apparatus may be supplied, for example, to the mixture downstream of the jet compressor.

The method for conversion of heat energy into mechanical, electrical and/or thermal energy by the expansion of a gaseous working medium in an expansion apparatus connected to an evaporator may, in a preferred embodiment, be carried out as low-pressure expansion,
- the expanded working medium being compressed by means of a jet compressor following the expansion apparatus,
- a propellant heated in the collector being supplied to the jet compressor,
- the jet compressor being operated such that the final temperature of the mixture reached after compression lies above the evaporation temperature of the working medium in the evaporator, so that the mixture of working medium and propellant condenses in heat exchange with respect to the liquid working medium boiling in the evaporator,
- the condensate being conveyed into a separation apparatus by means of a pump, the pump being operated by an expansion device to which propellant is supplied from the collector, and
- propellant being conveyed back to the collector and working medium back into the evaporator from the separation apparatus via supply lines, preferably by means of a level-controlled switching valve.

The temperature of the propellant which is supplied to the jet compressor should preferably lie above the temperature of the working medium which is supplied to the jet compressor. Furthermore, it is advantageous if the temperature of the propellant which is supplied to the jet compressor lies above the temperature of the working medium evaporated in the evaporator.

The temperature of the propellant which is supplied to the jet compressor may lie in the range of $\geq 40°$ C. to $\leq 200°$ C., preferably $\geq 70°$ C. to $\leq 150°$ C. and preferably $\geq 90°$ C. to $\leq 120°$ C.

According to one version of the present invention, at least one expansion apparatus may be arranged in the second circuit.

For example, at least one part stream of the propellant may be conducted, branched off downstream of the collector, through the working medium evaporator and/or be conducted past the working medium evaporator for the purpose of the transmission of heat to the working medium in the evaporator. The propellant is subsequently recirculated into the collector.

Furthermore, at least one part stream may be branched off downstream of the collector and supplied to at least one expansion apparatus. The expanded propellant of the branched-off part stream may then be routed through the working medium evaporator and/or be routed past the working medium evaporator for the purpose of transmitting heat to the working medium in the evaporator. The propellant is subsequently recirculated into the collector.

In the part-stream routing of the second circuit, at least one expansion device, for example a turbine, may additionally be arranged, which may be used, for example, as the drive of a pump.

It would be appreciated that the temperature of the propellant is higher than the temperature of the working medium in the evaporator for the purpose of transmitting heat to the working medium in the evaporator.

Furthermore, it may be advantageous if the pressure of the propellant in the second circuit is always higher than the pressure of the working medium in the second circuit.

Furthermore, it may be advantageous if the working medium circuit comprises a priority of working medium part streams. Each working medium part stream may have at least one evaporator and/or at least one expansion evaporator.

Using a plurality of evaporators may have the advantage that the heat energy absorption can be transmitted more quickly to the working medium than if only one evaporator were used.

For example, a plurality of expansion apparatuses may be connected one behind the other in a working medium stream.

According to a preferred embodiment, for example, at least two, preferably at least three expansion apparatuses may be connected in series in a working medium stream.

Likewise, a plurality of expansion apparatuses may be connected one behind another in a propellant stream.

According to a preferred embodiment, for example, at least two, preferably at least three expansion apparatuses may be connected in series in the propellant stream.

It may be advantageous if the propellant circuit comprises a plurality of propellant part streams. Each propellant part stream may have at least one collector and/or one expansion apparatus.

In the jet compressor, working medium and propellant are brought together, a mixture being formed. The working medium in the mixture undergoes a pressure and temperature rise, as compared with the expanded working medium in the first circuit. By contrast, the propellant undergoes a temperature and pressure reduction, as compared with the propellant upstream of the jet compressor and downstream of the collector in the second circuit.

The mixture leaving the jet compressor is transferred in a common subsection and supplied to at least one heat transmission unit. The heat transmission unit may be arranged in and/or on the evaporator. The heat transmission unit preferably has at least one tube, tube coil or the like which is arranged in or on the evaporator for the purpose of transmitting heat to the working medium in the evaporator.

Heat transmission from the mixture to the working medium preferably takes place in the evaporator by means of the condensation of the mixture.

After heat transmission, the mixture is supplied to a separation unit in order to separate working medium and propellant from one another. The working medium is then recirculated into the first circuit and supplied to the evaporator for the purpose of evaporating the working medium. The separated propellant is then recirculated into the second circuit and supplied to the collector for the purpose of heat energy absorption.

The transport of working medium, propellant and/or mixture may take place by means of at least one pump.

Preferably, at least one pump is arranged in the common subsection between the heat transmission unit and the separation apparatus.

The energy required for operating the pump may originate from an expansion apparatus and/or an expansion device.

This is advantageous since in this way there is no reliance on additional energy sources, such as electrical energy and/or fossil fuels.

The method according to the invention provides the conversion of heat energy into mechanical energy by an expansion of the vaporous working medium in an expansion assembly which is connected to the evaporator and which operates with high efficiency even in the low pressure range, for example $\geqq 3$ bar and $\leqq 8$ bar, preferably $\geqq 2$ bar and $\leqq 6$ bar and particularly preferably $\geqq 1.5$ bar and $\leqq 4$ bar.

High efficiency within the meaning of this invention may be a 60% machine efficiency, preferably more than 70%, even more preferably more than 80% machine efficiency.

Such a low-pressure expansion apparatus may be implemented, according to the invention, by a rotary blower pump having a gas-tight suction space.

A collector within the meaning of this invention is, for example, a radiation receiver, such as solar collectors, heat exchange assemblies, pipelines and/or cooling towers.

The mixture of propellant and expanding working medium has, after compression, a temperature which is higher than the evaporation temperature of the working medium in the evaporator, so that the mixture can condense in heat exchange with respect to the working medium in the evaporator. In this case, the mixture discharges its condensation enthalpy to the boiling working medium in the evaporator. The condensate is subsequently separated into working medium and propellant by a conveying device in a separation apparatus and acted upon with pressure such that the propellant, on the one hand, is recirculated back to the collector and on the other hand, the working medium is recirculated, for example, via a level-controlled switching valve, back into the evaporator of the first working medium circuit.

One advantage of the present invention is that there is no need for an independent cooling device or cooling tower for condensation. This is beneficial particularly when there are no cooling media available at the location. Moreover, the condensation energy is not lost into the surroundings, but continues to be utilized in the process. This becomes possible due to the heating of the mixture to above the evaporation temperature of the working medium in the first circuit.

In a further preferred version, the method according to the invention may be designed for a simultaneous conversion of heat at different temperature levels into mechanical energy.

Such instances are often found in industrial systems, for example in waste heat from internal combustion engines, where temperatures around about 300° to 400° C. are present in the exhaust gas and of about 90° to 110° C. in the cooling water.

Further examples are often to be found in businesses employing thermal processes, where different temperature levels can be encountered, depending on the respective heat sources. However, the configurations may also be brought about deliberately, in that, for example, low-temperature heat sources, such as geothermy, or solar heat from non-concentrating collector systems are combined with heat sources which allow even higher temperatures, for example oil or gas burner systems. Such combinations are often also to be found in the form of back-up systems, for example, for the bridging of day/night fluctuations in solar heat.

Under such framework conditions with two different temperature levels, the propellant generated by means of a high-temperature heat source may not only be utilized for driving the jet compressor, but may additionally be expanded itself in a second expansion assembly.

Expanded propellant in high-pressure expansion at, for example, $\geqq 6$ bar and $\leqq 20$ bar, preferably >10 bar and preferably $\geqq 15$ bar, is subsequently condensed in heat exchange with the evaporator of the working medium of the "low temperature stage".

In this context, "low-temperature stage" also called "low-pressure stage", means that the expanded propellant from the high-pressure stage must still be so high that the pressure-dependent compensation temperature is lower than the evaporation temperature in the low-pressure evaporator. In this case, the condensation enthalpy still contained in the expanded high-pressure propellant is utilized for the low-pressure process. A plant-related advantage arises from the fact that the evaporator of the low-pressure stage constitutes at the same time the condenser of the high-pressure stage.

In this version, the method may be carried out with only one working medium for the high-pressure and low-pressure stage, insofar as the thermal dynamic data of the selected working medium are coordinating with the given temperature levels of the two heat sources (for water as working medium at about 170° C., the high-pressure stage could be about 8 bar, the low-pressure stage could be about 2 bar and the evaporation temperature could be about 120° C.).

Alternatively, however, the method according to the invention may also be carried out with a working medium and propellant which differ from one another chemically for the "high-pressure circuit" and the "low-pressure circuit". In this case, it will then be necessary to separate the two working medium and propellant from one another in the separation apparatus.

This is possible in the simplest way in the case of immiscible liquids which are segregated in the separation apparatus and are separated by gravity according to the specific weight.

The inventive feature that expanded propellant is transformed by the function of the jet compressor to a temperature level such that it can be recirculated into the evaporator, with the result that an additional external cooling apparatus for condensation is avoided, offers the possibility, in a further preferred version of the method according to the invention, of carrying out the evaporation of the working medium basically also below the average ambient temperature, so that, in a similar way to a heat pump, the ambient heat itself can be utilized as a heat source for the evaporation of the working medium. In this embodiment, working media are used, the boiling point of which is so low that the vapour generated in the evaporator has under the customary ambient conditions a pressure of $\geqq 2$ bar, preferably $\geqq 3$ bar and $\leqq 5$ bar.

In order to condense the formed mixture additionally in the evaporator, the boiling temperature in the evaporator and the pressure and temperature of the mixture after compression must be coordinated with one another such that the mixture can be condensed in the common subsection by heat transmission with boiling working medium in the evaporator of the first circuit.

The working medium may have a boiling temperature of between −20° C. and 80° C., preferably of between 10° C. and 60° C.

In this version, the method according to the invention may be operated such that the first circuit of the working medium is heated by the ambient heat at temperatures of, for example, up to 40° C. and a second circuit of the propellant is heated by means of non-concentrating sheet-like solar collectors which reach flow temperatures of between 80° C. and about 120° C. As a result, the plant may be driven solely by the inexhaustible and cost-free solar heat, part of the drive energy in the evaporator being utilized multiply for the formation of propellant. In addition, the arrangement does not require any separate cooling device, this being a great advantage precisely at many high-sunshine locations, for example, in southern Europe or Africa.

Over and beyond the versions described hitherto, the method according to the invention affords, as an additional inventive feature, the possibility of driving the drives of any mechanical conveying devices via an expansion turbine which is driven by propellant from the collector or the heat source. The advantage of this arrangement is that any external mechanical and electrical auxiliary energies for implementing the method and for operating an associated plant are dispensed with entirely.

An expansion device, such as an expansion turbine, according to the present invention, may be operated with a pressure difference of more than 3 bar, preferably of more than 5 bar to 20 bar. This expansion turbine is to serve expressly as a "purely" mechanical drive assembly for the conveying pump, so that an electric drive for a conventional mechanical pump is avoided here. Thus, by means of the method according to the invention, a process can be implemented which obtains current directly from solar heat, but does not constitute a photovoltaic system.

As a result, the plant set up by the method according to the invention is capable of starting up from the state of rest solely by means of the absorbed heat energy, without a mechanical or electrical starter energy being required in any form.

Basically, heat energy can remain available in any desired form in addition to solar energy, for example also as fossil energy or bioenergy. Also, it can be made available in the form of waste heat which is utilized either directly or after conversion with the aid of one or more heat pumps for the method according to the invention.

Consequently, the energy source or energy sources for generating the heat energy required for driving the jet compressor may be, in addition to a collector, for example, a solar collector, also an exhaust-gas heat source, a waste-heat source from combustion processes, a geothermal source, a heat pump, a fuel cell, a waste-heat source from cooling processes, an internal combustion engine or a block heating power station.

It is preferable to provide heat energy from ambient or solar heat, preferably by means of non-concentrating collector systems, using selected suitable working media in terms of boiling temperature and the evaporation pressure attainable, alternatively also in combination with concentrating collector systems, by means of which higher temperatures can be provided, or another heat source which provides heat at a sufficiently high temperature level in order to generate the required propellant for the jet compressor.

A further subject of the invention relates to a plant for the conversion of heat energy from solar radiation into mechanical, electrical and/or thermal energy.

The point according to the invention for the conversion of heat energy into mechanical, electrical and/or thermal energy comprises at least one low-pressure expansion apparatus and at least one jet compressor.

Preferably, furthermore, the plant comprises:
a first circuit in which a working medium is routed,
a second circuit in which a propellant is routed,
a common subsection in which a working medium and a propellant are jointly routed.

The plant for the conversion of heat energy into mechanical, electrical and/or thermal energy comprises, in particular, at least one evaporator unit, an expansion apparatus connected to the latter and at least one jet compressor, a first circuit in which a working medium is routed, a second circuit in which a propellant is routed, a common subsection in which working medium and propellant are jointly routed, and a separation apparatus in which working medium and propellant are separated, and a collector for heating the propellant, the heat energy of the mixture being utilized in the common subsection for the evaporation of working medium in the evaporator unit.

An evaporator unit for evaporating the working medium and, following it, an expansion apparatus preferably a low-pressure expansion apparatus, for expanding the working medium are arranged in the first circuit.

At least one collector for the heat energy absorption of the propellant is arranged in the second circuit.

At least one separation apparatus for the separation of working medium and propellant is arranged in the common subsection.

Preferably, the first and the second circuit are connected to the jet compressor, the jet compressor and the separation apparatus are connected via the common subsection and the separation apparatus is connected to a first and a second circuit.

According to the invention, a plant for the conversion of heat energy from solar radiation into mechanical electrical and/or thermal energy is made available which comprises the following components:
a) an evaporator unit in which a working medium can be evaporated,
b) an expansion apparatus which is optionally connected to a generator, the expansion apparatus, preferably a low-pressure expansion apparatus, following the evaporator unit,
c) a jet compressor which follows the expansion apparatus and in which the expanded vaporous working medium is compressed,
d) a collector as a device for collecting the heat energy, by means of which propellant is brought to a higher temperature level,
e) a pump and a separation apparatus with at least one valve, in which the mixture is separated into working medium and propellant,
f) an expansion device, preferably an expansion turbine, which drives the pump,
g) if appropriate, a further low-pressure expansion apparatus with a coupled generator, which apparatus is arranged in a second circuit downstream from the collector,
h) if appropriate, a liquid conveying pump for the rising pressure when the jet compressor is driven by means of a liquid.

The plant according to the invention may be configured such that propellant and/or mixture are conducted at and/or the evaporator unit for the purpose of transmitting heat to the working medium, the propellant and/or through the mixture preferably being routed through a pipeline and/or pipe coil at and/or into the evaporator.

The plant according to the invention may comprise, for example, three propellant part streams, preferably a first part stream of the propellant leading to an expansion apparatus, a second part stream of the propellant leading into a jet compressor and a third part stream leading into an expansion device.

It may be preferred if the first part stream of the propellant is recirculated, downstream of the expansion apparatus, at and/or through the evaporator into the collector, the second part stream of the propellant is intermixed with the working medium in the jet compressor and is then routed in a common subsection as far as the separation apparatus and, after separation, is then returned into the collector, and a third part stream is supplied, downstream of the expansion device, to the mixture downstream of the jet compressor.

The conduction of the working medium, propellant and/or mixture preferably takes place through pipelines, unless otherwise specified. To avoid heat losses, it is advantageous if the pipelines have heat insulation, insofar as this is advantageous.

Further advantages, features and details of the invention may be gathered from the following description in which exemplary embodiments of the invention are described in detail with reference to FIG. 1 and FIG. 2. In this case the features mentioned in the claims and description may, in each case, be essential to the invention individually in themselves or in any desired combination.

Figure 1:
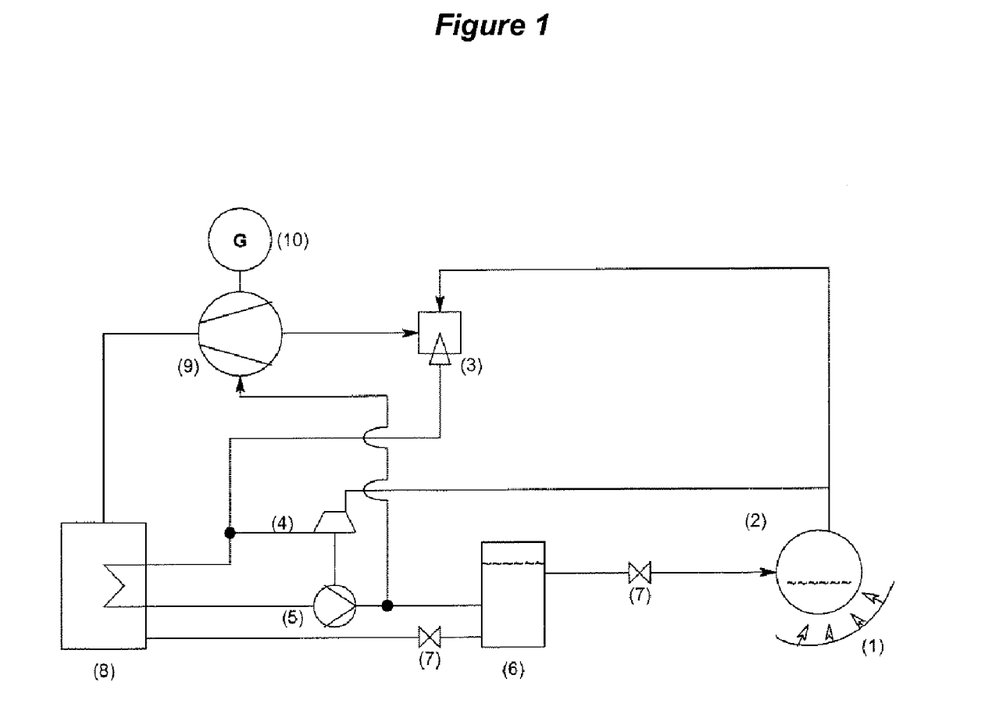
FIG. 1 shows a plant for the conversion of heat energy into mechanical, electric and/or thermal energy.

In the drawings:

FIG. 1 illustrates, as an example, a conversion of solar heat by means of a concentrating parabolic trough collector (2) for generating the propellant for the jet compressor.

The heat energy occurring from the energy source (1), "solar radiation", in a collector (2) heats propellant for a jet compressor (3). During the expansion of the propellant in the jet compressor (3), the propellant transmits heat energy to the vaporous working medium which has been evaporated in an evaporator unit (8) and expanded in an expansion apparatus (9), preferably a low-pressure expansion apparatus (9), following the evaporator. The working medium and propellant are chemically identical, so that a homogeneous vapour phase is formed during intermixing in the jet compressor (3).

The plant is operated such that the pressure level and therefore the temperature of the mixture of working medium and propellant are higher than the pressure and the boiling temperature of the working medium boiling in the evaporator (8). The mixture in the common subsection can therefore transmit its condensation energy, when it passes through the evaporator (8), by heat energy transmission to the working medium boiling in the evaporator (8). The condensate of the mixture is separated in a separation apparatus (6), and, by means of a pump, on the one hand, propellant is conveyed back into the second circuit having a solar collector (2) and, on the other hand, working medium is conveyed into the first circuit via a supply line provided via a supply line provided with a level-controlled valve, back into the evaporator (8). The pump (5) is driven by an expansion apparatus (4), preferably an expansion turbine (4), which is acted upon with propellant from the solar collector (2).

Figure 2:
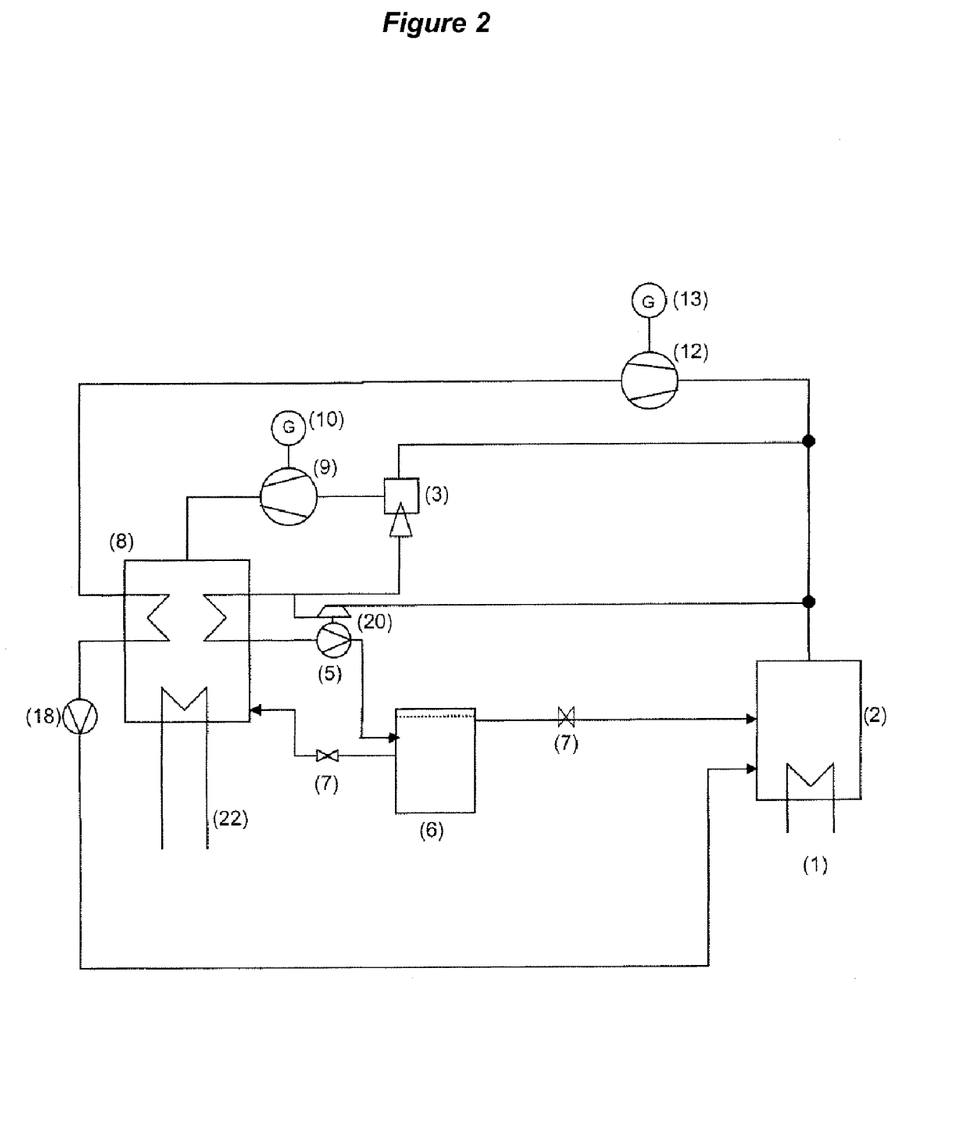
FIG. 2 shows a plant for the conversion of heat energy into mechanical, electrical and/or thermal energy in a two-stage version.

FIG. 2 illustrates an embodiment with two heat sources in each case at two different temperature levels. This is based on a conversion of the waste heat from a block heating power station and from cooling water for engine cooling, while the exhaust gases are to be considered as a heat source at a higher temperature level and the cooling water from engine cooling as a low temperature heat source. Heat from the exhaust gas stream of an internal combustion engine is supplied to the propellant-containing collector (2) of the second circuit and evaporates the propellant located in the collector. A first part stream of the propellant vapour is supplied to the jet compressor (3). The second part stream of the propellant vapour is supplied to an expansion apparatus (12) and expanded, mechanical energy being converted into electrical energy by means of a connected generator (13). After the expansion of the propellant vapour of the second part stream, the propellant vapour is conducted through the working medium evaporator unit (8), the propellant vapour discharging heat energy to the working medium for the purpose of evaporation and at the same time condensing. The condensed propellant of the second part stream is recirculated into the collector by means of the conveying pump (18). The evaporated propellant of the first part stream which is supplied to the jet compressor (3) is mixed with the working medium of the first circuit, supplied to the jet compressor (3), so as to form a mixture. Furthermore, the working medium evaporated in the evaporator (8) is expanded in an expansion apparatus (9) which is connected to a generator (10). The expanded working medium of the first circuit is supplied to the jet compressor (3). In the common subsection, the mixture of working medium and propellant is conducted from the jet compressor (3) through the evaporator unit (8) for the purpose of transmitting heat energy from the mixture to the working medium in order to evaporate working medium in the evaporator (8). The mixture condensed during heat transmission is conveyed into the separation apparatus (6) by means of the pump (5). In the separation apparatus, the mixture is separated and working medium is recirculated into the evaporator (8) and propellant is recirculated into the collector (2). The pump (5) is driven by an expansion device (20) which is driven via a third part stream of the propellant downstream of the collector (2), the third part stream being subsequently supplied either to the mixture and/or to the second part stream upstream of the pump (18).

LIST OF REFERENCE SYMBOLS

1 Energy source
2 Collector
3 Jet compressor
4 Expansion device
5 Pump
6 Separation apparatus
7 Valve
8 Evaporator
9 Expansion apparatus
10 Generator
12 Expansion apparatus
13 Generator
18 Pump
20 Expansion device
22 Energy source

The invention claimed is:

1. Method for the conversion of heat energy into mechanical, electrical and/or thermal energy, characterized in that the method comprises at least two circuits which are connected by means of at least one common subsection, the first circuit having at least one expansion apparatus, and the common subsection being connected to the first and second circuit via at least one jet compressor, a working medium being routed in the first circuit and a propellant being routed in the second circuit and a mixture of working medium and propellant being routed in the common subsection, the mixture formed in the at least one jet compressor subsequently being separated into a working medium stream and a propellant stream in a separation apparatus, the working medium being recirculated into the first circuit and being supplied to an evaporator, evaporated working medium being delivered to the at least one expansion apparatus and subsequently to the at least one jet compressor, and separated propellant being recirculated into the second circuit and, for the purpose of the absorption of heat energy, being supplied to a collector and, after heat energy absorption, being supplied to the at least one jet compressor.

2. Method for the conversion of heat energy into at least one of mechanical, electrical and thermal energy according to claim 1, characterized in that the at least one expansion apparatus is a low-pressure expansion apparatus.

3. Method for the conversion of heat energy into at least one of mechanical, electrical and thermal energy according to claim 1, characterized in that the temperature and the pressure of the mixture of propellant and sucked-in working medium being higher at the time point of the transmission of heat energy to the working medium for the purpose of evaporation in the evaporator than those of the working medium to be evaporated which is located in the evaporator.

4. Method for the conversion of heat energy into at least one of mechanical, electrical and thermal energy according to claim 1, characterized in that condensed propellant is recirculated at least partially to an external heat source for the purpose of evaporation.

5. Method for the conversion of heat energy into at least one of mechanical, electrical and thermal energy according to claim 1, characterized in that in the transmission of heat energy from vaporous propellant to the working medium located in the evaporator, condensed propellant is recirculated into the separation apparatus.

6. Method for the conversion of heat energy into at least one of mechanical, electrical and thermal energy according to claim 1, characterized in that the temperature of the external heat source amounts to $\leq 500°$ C.

7. Method for the conversion of heat energy into at least one of mechanical, electrical and thermal energy according to claim 1, characterized in that the pressure of the working medium in at least one of the evaporator and upstream of the at least one expansion apparatus amounts to $\geq 1.5$ bar and $\leq 10$ bar.

8. Method for the conversion of heat energy into at least one of mechanical, electrical and/or thermal energy according to claim 1, characterized in that the pressure of the propellant immediately after it leaves the at least one compressor, lies at least 0.3 bar above the pressure of the working medium in the evaporator.

9. Method for the conversion of heat energy into at least one of mechanical, electrical and thermal energy according to claim 1 by the expansion of the working medium in gaseous form in the at least one expansion apparatus connected to the evaporator, characterized in that the expansion is carried out as low-pressure expansion,
the expanded working medium is compressed by means of the at least one jet compressor following the at least one expansion apparatus,
the propellant heated in the collector is supplied to the at least one jet compressor,
the at least one jet compressor is operated such that the final temperature of the mixture reached after compression lies above the evaporation temperature of the working medium in the evaporator, so that the mixture of working medium and propellant condenses in heat exchange with respect to the liquid working medium boiling in the evaporator,
the condensate is conveyed into the separation apparatus by means of a pump, the pump being operated by an expansion device to which propellant is supplied from the collector, and
propellant is conveyed back to the collector and working medium back into the evaporator from the separation apparatus via supply lines.

10. Method according to claim 1, characterized in that the working medium has a boiling temperature of between $-20°$ C. and $80°$ C.

11. Method according to claim 1, characterized in that the working medium is an organic solvent preferably selected from the class of monovalent or polyvalent alcohols, aldehydes, ketones or esters or acids, refrigerant, and/or a silicone.

12. Method according to claim 1, characterized in that the heat energy which is fed into the collector or the evaporator originates at least partially from an energy source comprising exhaust gas heat, waste heat from combustion processes, geothermal sources, solar collectors, heat pumps, fuel cells, waste heat from cooling processes, ambient heat from air or water, an internal combustion engine, or a block heating power station.

13. Method according to claim 1, characterized in that the propellant generated in the collector is not only fed into the jet compressor but is additionally expanded via a second expansion apparatus of the at least one expansion apparatus.

14. Method according to claim 1, characterized in that the expansion of the propellant operates a second expansion apparatus of the at least one expansion apparatus such that the expanded propellant may be condensed directly in heat exchange with the boiling working medium in the evaporator and the condensate is conveyed back into the collector by means of a pump.

15. Method according to claim 1, characterized in that the working medium has a molar evaporation enthalpy of less than 35 kJoule per mol and more than 15 kJoule per mol.

16. Method according to claim 1, characterized in that the working medium and the propellant are formed from the same substance or substance mixture so that the mixture is homogeneous.

17. Method according to claim 1, characterized in that the working medium and the propellant are formed from two different substances or substance mixtures.

18. Method according to claim 1, characterized in that the at least one expansion apparatus is connected to a generator.

19. Method according claim 1, characterized in that the propellant expanded in the expansion device is supplied to the mixture downstream of the at least one jet compressor.

20. Plant for the conversion of heat energy into at least one of mechanical, electrical and thermal energy according to claim 1 the plant being configured so that the heat energy of the mixture is utilized in the common subsection for evaporating the working medium in the evaporator.

21. Plant according to claim 20, wherein the evaporator, adapted for evaporating the working medium, and, following it, the at least one expansion apparatus in the form of a low-pressure expansion apparatus for expanding the working medium, are arranged in the first circuit, and the collector arranged in the second circuit is adapted for the heat energy absorption of the propellant, and the separation apparatus is arranged in the common subsection and is adapted for the separation of working medium and propellant.

22. Plant according to claim 20, wherein the first and the second circuit are connected to the at least one jet compressor, and the at least one jet compressor and the separation apparatus are connected via the common subsection, and the separation apparatus is connected to the first and the second circuit.

23. Plant according to claim 20, further comprising at least one pump for the transfer of working medium, propellant and/or a mixture.

24. Plant according to claim 20, comprising at least one expansion device, the at least one expansion device being arranged in a part stream of the second circuit of the propellant downstream of the collector.

25. Plant according to claim 20, comprising at least three propellant part streams, including a first part stream of the propellant leading to the at least one expansion apparatus, a second part stream of the propellant leading into the at least one jet compressor and a third part stream leading into an expansion device.

26. Plant according to claim 25, wherein the first part stream of the propellant is recirculated, downstream of the at least one expansion apparatus, at and/or through the evaporator into the collector, the second part stream of the propellant is intermixed in the at least one jet compressor with working medium and then is routed in the common subsection as far as the separation apparatus and, after separation, then is returned into the collector, and the third part stream is supplied, downstream of the expansion device, to the mixture downstream of the at least one jet compressor.

27. (Plant according to claim 20, comprising:
   a) the evaporator in which a working medium can be evaporated,
   b) the at least one expansion apparatus which is connected to a generator, wherein the expansion apparatus is a low-pressure expansion apparatus, following the evaporator,
   c) the at least one jet compressor which follows the at least one expansion apparatus and in which the expanded working medium is compressed,
   d) the collector which is adapted to collect the heat energy, by means of which propellant is brought to a higher temperature level,
   e) a pump and the separation apparatus with at least one valve, in which the mixture is separated into working medium and propellant,
   f) an expansion device, in the form of an expansion turbine, which drives the pump,
   g) a further low-pressure expansion apparatus with a coupled generator, which apparatus is arranged in the second circuit downstream from the collector,
   h) a liquid conveying pump for the pressure rise when the at least one jet compressor is driven by means of a liquid.

28. Plant according to claim 20, characterized in that the collector is a solar collector, a heat exchanger or a combustion device.

29. Plant according to claim 20, characterized in that at least one of propellant and mixture is conducted through the evaporator for the purpose of heat transmission to the working medium, the at least one of propellant and mixture being routed through at least one of a pipeline, a pipe coil and the evaporator.

30. Plant according to claim 20, characterized in that the at least one expansion apparatus is connected to a generator which converts mechanical energy into electrical energy.

31. Plant according to claim 20, characterized in that condensate of the mixture is conveyed into the separation apparatus by means of the pump.

32. Plant according to claim 20, characterized in that propellant expanded in an expansion device is supplied to the mixture downstream of the at least one jet compressor.

33. Plant according claim 20, which can be operated according to claim 1.

* * * * *